United States Patent [19]

Carey et al.

[11] Patent Number: 4,951,705

[45] Date of Patent: Aug. 28, 1990

[54] TWO-WIRE I/P CONVERTER WITH ENERGY STORAGE

[75] Inventors: David C. Carey; Neil V. Peers, both of West Yorkshire; Stuart D. Stoney, Leeds, all of England

[73] Assignee: Watson Smith Limited, Leeds, England

[21] Appl. No.: 349,424

[22] Filed: May 8, 1989

[30] Foreign Application Priority Data

May 11, 1988 [GB] United Kingdom ............... 8811123

[51] Int. Cl.$^5$ ............................................ F16K 31/126
[52] U.S. Cl. ............................ 137/487.5; 137/116.5; 251/30.01
[58] Field of Search .................. 137/116.5, 487.5; 251/30.01

[56] References Cited

U.S. PATENT DOCUMENTS

| | | | |
|---|---|---|---|
| 2,806,481 | 9/1957 | Faust | 137/116.5 |
| 2,994,334 | 8/1961 | Loveless | 137/116.5 |
| 3,240,223 | 3/1966 | Vander Horst | 137/116.5 |
| 3,369,561 | 2/1968 | Zimmerman et al. | 137/487.5 |
| 4,722,360 | 2/1988 | Odajima et al. | 137/487.5 |

*Primary Examiner*—A. Michael Chambers
*Attorney, Agent, or Firm*—Cushman, Darby & Cushman

[57] ABSTRACT

A pneumatic regulator in the form of an electro-pneumatic device (an I/P regulaor) in which the pressure of pneuamtic medium is controlled in response to an electrical signal in which the pneumatic pressure regulator incorporates a control volume whose pressure is used to regulate the main pneumatic pressure and the pressure in the control volume being under the control of pneumatic valves, the valves being opened and closed by electrical signals provided by an electrical circuit, which circuit incorporates electrical storage so as to permit the electrical circuitry to operate the valve on currents in the range 4–20 mA so that the electro-pneumatic regulator can be operated directly by electronic control systems without the need of supplementary electrical feeds.

13 Claims, 4 Drawing Sheets

TWO-WIRE I/P CONVERTER WITH ENERGY STORAGE

Background of the Invention

This invention relates to electro-pneumatic regulators and has particular reference to such regulators commonly referred to as I/P ("I to P") regulators.

I/P regulators are used to control pneumatic pressure—usually of compressed air-in response to the electrical output of an electronic source. The common industry standard for the electronic source is that the current should vary in the range 4–20 mA with 4 mA corresponding to minimum pressure and 20 mA to maximum pressure.

Electro-pneumatic regulators may either fail to zero when the current is cut off, or may fail to a freeze condition or to another pressure predetermined by the user. In a fail to zero regulator, the absence of current results in the pressure on the output line falling to a minimum. In a fail-freeze regulator, the sudden absence of current results in the pressure in the output line being maintained at the level obtaining immediately prior to the current failure. This is of advantage where the power is deliberately cut off when no pressure changes are required.

A fail to a user predetermined pressure involves a pre-programmed device which either causes the device to fail freeze or to fail to any other predetermined pressure, such as fail to maximum or fail to a given pressure.

Two-wire I/P regulators, ie regulators which work off the electrical signal produced by the electronic apparatus, are known in which the electrical power operates an electromagnet to balance pneumatic pressure so as to regulate pressure. Such two-wire devices are fail to zero and a typical example is the Watson Smith I/P Converter Type 100, available from Watson Smith Limited, of Cross Chancellor Street, Leeds, England. Although such I/P converters are very accurate, they are somewhat fragile and difficult to make and they fail to zero, and the user cannot determine what happens to the pressure when they fail.

An alternative form of electro-pneumatic regulator is an electronic device which controls the flow of air into the control chamber of a pressure regulator by means of low power solenoid valves. Such regulators require, however, a supplementary power source to permit them to operate. Such regulators as the Watson Smith Type 400 Series are also available from Watson Smith Limited.

The 400 Series, although it is fail-freeze, is not capable of operating solely on the power available from the electronic signal source, and requires a supplementary power source.

Electro-pneumatic converters have also been proposed which fail-freeze and which appear to operate by the use of two wires only. Such devices are motorised devices in which an electric motor controls the position of the valve and the motor is driven by the power supplied from an electrical source. These devices need the external power source to operate the motor, namely a common return and an open and close wire for an AC motor or if a DC motor is used the device requires only two wires. However, such DC motors do not operate from the electronic power source directly, but utilise an external power source which is controlled by the controller. Such systems are also not I/P converters in that the position of the valve is determined by the duration of operation of the motor rather than directly from the value of the current supplied by the electronic controller.

A two-wire I/P converter as used herein therefore means an electro-pneumatic converter capable of regulating pressure of a fluid in response to variation in current from an electronic control circuit directly, without the use of supplementary power utilising an electrical current in the range 4–20 mA.

To date however, no fail-freeze, or other fail to a pressure predetermined by the user, I/P regulators have been available commercially capable of operating directly from the electronic signal source without an auxiliary electrical power supply. Although I/P regulators which have a slow decay so as to fail slowly to zero have been proposed in UK Patent Specification No 1 185 709.

The Publication "Process Automation", 1981, pages 16 to 27 describes an electro-pneumatic signal unit which is a motorised device, such devices are however not normally powered by the control signal. Furthermore in FIG. 6 of the article there is a reference to a double solenoid unit which however requires a powered amplifier indicating that it requires an external electrical power source.

U.S. Pat. No. 4,509,547 describes the use of a DC motor, a pressure regulator in which feed back is provided from the outlet pressure by means of a pressure transducer.

UK specification 2123184 and 2128372 describes fail fix servo valves.

UK patent specification 21243974 describes a system for linearising of the compressor prezo resistive transducer.

UK patent specification 1214 describes a fail freeze flapper valve driven by a motor.

European patent application 46287 and 57581 describes fluid regulators.

PCT application 84/01445 describes a device in which the control signal of the reverse feedback are sent over the same pair of wires.

Summary of the Invention

By the present invention there is provided an I/P converter which on removal of the signal current fails to a pressure predetermined by the user. Such a pressure may be the then current pressure or some predetermined pressure.

The present invention also provides a fail to a user predetermined pressure two-wire electrically controlled fluid pressure regulator capable of operation with full-range control on an electrical current input in the range 4–20 mA to produce a proportionate pressure output in which the regulator includes a control volume whose pressure is variable in response to the electrical signal, and whose pressure controls the output pressure of a regulator in a manner known per se, there being provided normally closed inlet and outlet valves, the pressure in the control volume being increased by opening an inlet valve to admit high pressure, and the pressure in the control volume being reduced by opening an outlet valve to permit the egress of high pressure from the control volume, a pressure transducer to measure the pressure of the regulated output and electrical circuitry to control the pressure of fluid in the control volume in response to an electrical signal by comparison with the electrical signal produced by the pressure transducer, characterised in that the electrical circuitry includes means to store electrical energy so that the average current demand of the circuitry over the period of operation of the regulator is less than 4 mA but that the circuit can provide higher current peaks from storage to operate the inlet and outlet valves.

The pressure may be the current operating pressure (a fail-freeze device) or any other predetermined pressure such as the maximum, or even if required a zero pressure.

Preferably the storage is provided by a capacitor in the electrical circuitry, or by a battery.

The electrical circuitry may be C-MOS circuitry with an inbuilt clock. The circuitry may be substantially switched off by the clock to permit the capacitor to be charged during periods of non-operation of the valves.

The valves are preferably reed switch flow control valves with the valves being pulsed to control the flow of fluid into and out of the control volume. The pulses may be provided in two forms, a large pulse at maximum energy to cause one or other of the valves to open followed by a train of narrower lower energy pulses to hold the valve open. The overall length of the opening pulse and the train of small pulses may be varied to hold the valves open for longer or shorter times.

There may be provided a pressure transducer responsive to pressure at the output of the regulator valve to provide feed back for the electrical circuitry. The electrical circuitry preferably compares the feedback signal with the desired signal to determine the frequency and duration of the pulses. The greater the difference between the instructed signal and the output of the pressure transducer, the greater the valve opening time.

The width of the dead zone within which the valves are not opened in response to differences between the instructing signal and the signal of the pressure transducer may vary and may be larger the greater the difference between the instructing signal and the signal of the pressure transducer.

The frequency of operation of the valves may be up to 10 times per second.

The reed valves may be provided with a diode to permit energy storage of the valve inductance when the operating current is switched off. The diodes are arranged in parallel with the reed valve operating coil. There may be provided a resistance in series with the diode and the reed valve with a bypass switch in parallel with the resistance.

The I/P converter may fail to a predetermined pressure known as a pre-set pressure. Since the device has stored energy, the energy can be used to set the pressure to a predetermined level in the event of failure of the input signal.

Brief Description of the Drawings

By way of example embodiments of the present invention will now be described with reference to the accompanying drawings of which

Description of the Preferred Embodiments

Figure 1:
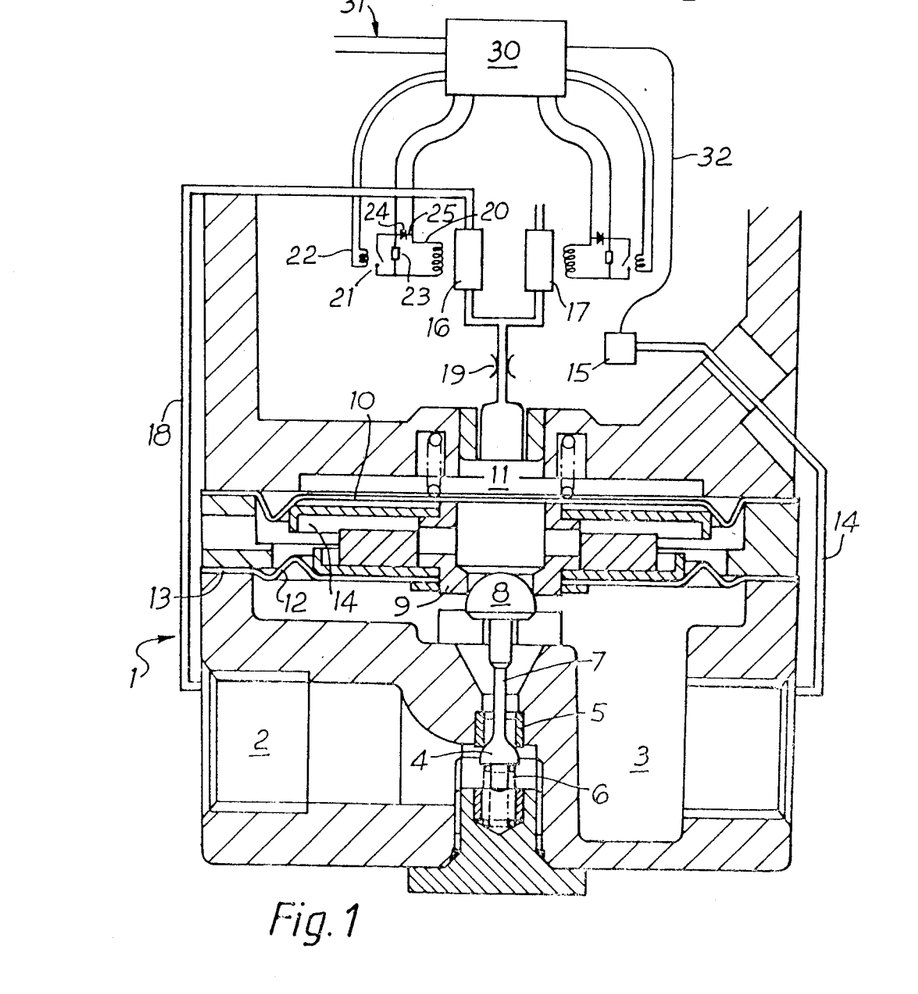
FIG. 1 is a schematic part sectional view of a valve in accordance with the present invention

Referring to FIG. 1, this shows an I/P regulator in accordance with the invention in which there is provided on the pneumatic side a pressure regulator generally indicated by 1, which is of fairly conventional form. The pressure regulator includes an inlet 2 and an outlet 3 with the flow of compressed air or other pneumatic fluid between the inlet and the outlet being influenced by the position of a valve member 4 mounted in valve seat 5. A spring 6 normally holds the valve member 4 in the closed position. The valve member 4 is connected via push rod 7 to a domed head 8 which mounts in an annular seating member 9. The annular seating member contacts the underside of diaphragm 10 which forms the lower side of a control volume 11. A lower diaphragm 12 is connected to the annular member 9 and is sealed around its periphery at 13. Between the two diaphragms 10 and 12 is an air space 14 which is connected to atmosphere.

It can be seen that if the valve 4 is moved in a downward direction as shown in the drawing, high pressure air in the inlet 2 will pass into the outlet 3. As the valve 4 rises, the flow of air through the valve formed between 4 and 5 is throttled to control the pressure in the outlet 3. Since the annular ring 9 is a solid member, it can be seen therefore that by controlling the position of diaphragm 10, the output pressure in 3 can be controlled. In fact, there is a fixed relationship between the pressure in the control volume 11 and the output pressure in the outlet 3. If the pressure in the outlet 3 is raised above the pressure in the control chamber 11, the pressure acting on the underside of diaphragm 12 causes it to move upwardly carrying with it annular member 9 and releasing air along the domed member 8 and out through chamber 14 to atmosphere.

Thus by controlling the pressure in the control volume 11, an accurate measure of control of the outlet pressure in 3 is available.

The outlet pressure in 3 is accurately monitored by a pressure transducer 15 which is connected to the outlet pressure by any suitable means shown schematically by pipe 14. Thus, pressure transducer 15 produces a signal which is directly related to the outlet pressure of the regulator.

The actual pressure in the control volume 11 is under the control of a pair of Reedex valves (trade mark) 16 and 17. Such Reedex valves are available from Watson Smith Limited and are available in normally closed and normally open versions. The Reedex valve is an electro-pneumatic valve which has two magnetic reeds, one fixed and one flexible set a small distance apart in a moulded plastic body. Application of a magnetic field in line with the reed from a magnetic coil induces attraction between the reeds, causing the flexible one to deflect until it touches the fixed one. As the flexible reeds move, an elastomer seal bonded to it either uncovers an orifice allowing a flow to occur (normally closed version) or shuts off the flow (normally open version). Removal of the magnetic field by disconnection of the electrical source allows the reed to relax, shutting off flow in the normally closed version and allowing it to occur in the normally open version.

The power consumption of an electro-pneumatic Reedex type valve is about 500 mW to turn on, but about 40 mW to hold it in the hold position.

The inlet valve 16 is connected to inlet pressure by any suitable means shown schematically by pipe 18. The outlet valve 17 is connected to atmosphere. Both the inlet and outlet valves are connected to the control volume 11. It can be seen therefore that to increase the pressure on the outlet side of the pressure regulator, it is merely necessary to open valve 16, valve 17 being normally closed. This results in the flow of high pressure air into control volume 11 moving downwardly diaphragm 10 which carries with it annular member 9 and increases the open position of valve 4. Similarly, to reduce the pressure in the outlet 3, valve 16 is closed and valve 17 is opened, thus reversing the operation of the regulator valve.

The electrical circuitry controlling both the inlet and the outlet valves are identical. The valve 16 is opened by means of passing an electrical current through a coil wound round the valve and shown schematically at 20. This causes the valve 16 to open, permitting air under pressure to flow through the valve into control volume 11 to increase the pressure in the outlet 3. Normally, when the valve 16 is opened, switch 21 (which is an electronic switch) is closed.

Normally, when the valve 16 is opened, switch 21 (an electronic solid state switch) is closed, permitting electrical current to bypass resistor 23. Diode 24 permits electrical current flow in only one direction and as such during operation and when the valve is energised no electrical current flows through the diode 24. However, when the electrical supply current is switched off, the induced electrical current due to the back electromotive force, (commonly referred to as the back emf), caused by the collapse of the magnetic field acting upon the inductance of the coil 20—due itself to the supply current being switched off, can flow through the diode 25. This electrical current flows in the opposite direction to the supply current, through closed switch 21 and back into the coil. This is referred to as "freewheeling" and allows energy storage within the loop. Switch 21 is only opened when it is required to dissipate electrical energy through resistor 23.

Figure 2:
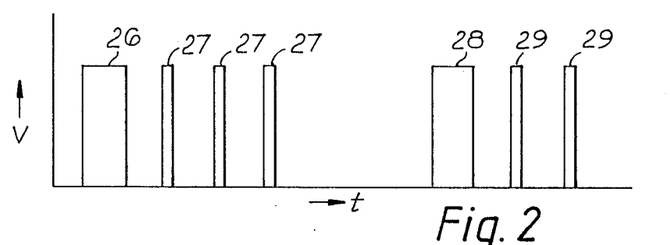
FIG. 2 is a graph of voltage against time

Rather than switching on the valve 16 and holding it on at the same level of applied voltage, voltage is pulsed through the valve as shown clearly in FIG. 2. An initial maximum pulse 26 is applied to "kick" the valve open. A train of pulses 27 then follow, which short pulses are sufficient to keep the valve open. After the final pulse 27 is passed, there is a space when the valve closes. A further large pulse 28 then re-opens the valve and again is followed by a series of short pulses 29 to hold the valve open.

The number of pulses 27 can be varied.

Typically, the frequency of pulses 27 is 25,000 Hz. The frequency of pulses 26 and 28 is approximately 10 Hz.

In the space between pulses 27 and 28, the electrical circuitry does not require any current, and this current is used to charge a capacitor in comparator circuitry 30 which produces the high level of energy pulses 28 require to operate valves 16 and 17.

The reduction in pressure obtained by opening valve 17 is effected in exactly the same way by means of the circuitry shown on the right hand side of valve 17.

The comparator circuitry 30 receives an input along lines 31, which input has a current level between 4 and 20 mA. The comparator circuitry also receives an indication of the pressure in the output via transducer 15 and line 32. When the comparator circuit distinguishes a difference between the input signal 31 and the monitored signal 32 greater than the dead zone, it causes a series of pulses to be triggered either to valve 16 or 17 to produce the desired change of pressure in control volume 11.

If the difference between control signal 31 and monitored signal 32 is large, then the number of pulses 27 following pulses 26 would be correspondingly large. However, as the difference signal gets narrower, the number of subsidiary pulses 27 is reduced so as to reduce over-shooting of the pressure in the control volume 11 which controls the output pressure 3.

Figure 3:
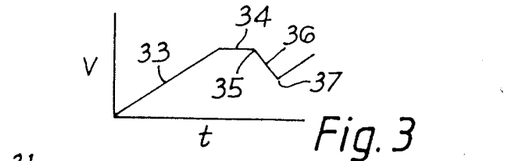
FIG. 3 is also a graph of voltage against time.

FIG. 3 shows the potential across a capacitor in comparator circuit 30. The current applied to the capacitor is constant but as the charge builds up in the capacitor, the voltage which can be obtained from the capacitor increases along line 33. Eventually, a value 34 is reached of maximum charge. As the valves are operated, charge is drawn from the capacitor as shown at position 35 causing the voltage to fall as at 36 until the valve is switched off as at 37.

The capacitor can be charged at any time when the Reedex valves are not being operated as has been set out above. By using C-MOS circuitry in the comparator, the current drain is typically ½ mA for the bulk of the circuitry and thus the average current available to the remainder of the circuitry can be kept to less than 4 mA, even though the operating current required to open the valve can be as high as 40 mA. This extra current is supplied via the capacitor:

Instead of using a capacitor a storage battery could be provided, but a capacitor has advantages in terms of convenience and cheapness.

One of the advantages of using a stored energy system is that it permits the continued operation of the valve after the cessation of signal current. Cessation may occur as a result of an accident or may be a deliberate act. For example, in battery controlled systems, it is desirable to minimise the signal time period to reduce the current drain on the battery. Thus, the advantage of a fail-freeze system not only is that it deals with accidents, but that also it copes with battery powered operation either on a long-term basis or where the battery is backing up the mains power.

In addition to fail to freeze and fail to zero devices, two other failure modes are possible, namely a fail to maximum, sometimes referred to as a reverse failure mode or failure to a preprogrammed pre-set pressure. With prior art systems, such a fail to pre-set is only possible if the signal is lost not the power. Clearly however, with a stored energy system, fail to pre-set is perfectly possible in that when the electronic circuitry detects an out of range signal, it can move the control pressure to any pre-set level which may of course be a maximum in the case of a reverse mode failure.

It will be seen, therefore that the unique feature of this two wire, ie loop powered, I/P convertor is that the unit is fail freeze. Output pressure is set by the pressure in the internal control volume, the pressure in which is controlled by Reedex (Registered Trade Mark) valves which are pneumatic reed relays. These relays take typically 40 mA to work and there is provided circuitry which overcomes the fundamental problem, namely that with a maximum current into the circuitry of 20 mA, two 40 mA relays have to be operated.

For most of the time the converter is in operation the output pressure is not being changed, therefore there is a minimum current of 4 mA passing through the circuit at all times, which is used to charge up a capacitor or a battery providing an internal store of energy which, when required, can provide the necessary power to open the relays.

This store of energy is of course finite and as such, circuit techniques have been developed to minimise the power used by the circuit at all times.

The electronic circuitry is powered from a supply rail of approximately 10 volts, this is controlled so that when the energy store is full, the excess current is 'dumped' through an LED; alternatively, if the circuitry takes too much power causing the supply rail to drop below a preset threshold, then most of the electronic circuits are switched off to allow the capacitor to recharge.

Figure 4:
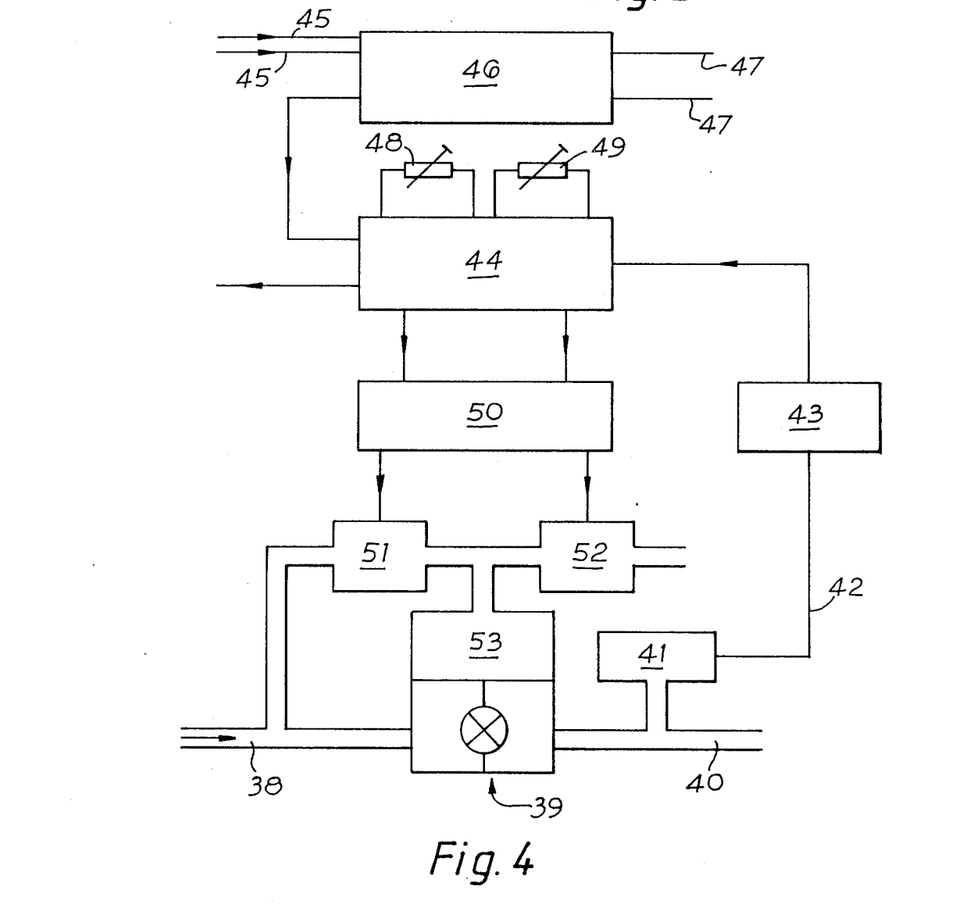
FIG. 4 is a block diagram of the invention.
Figure 5A:
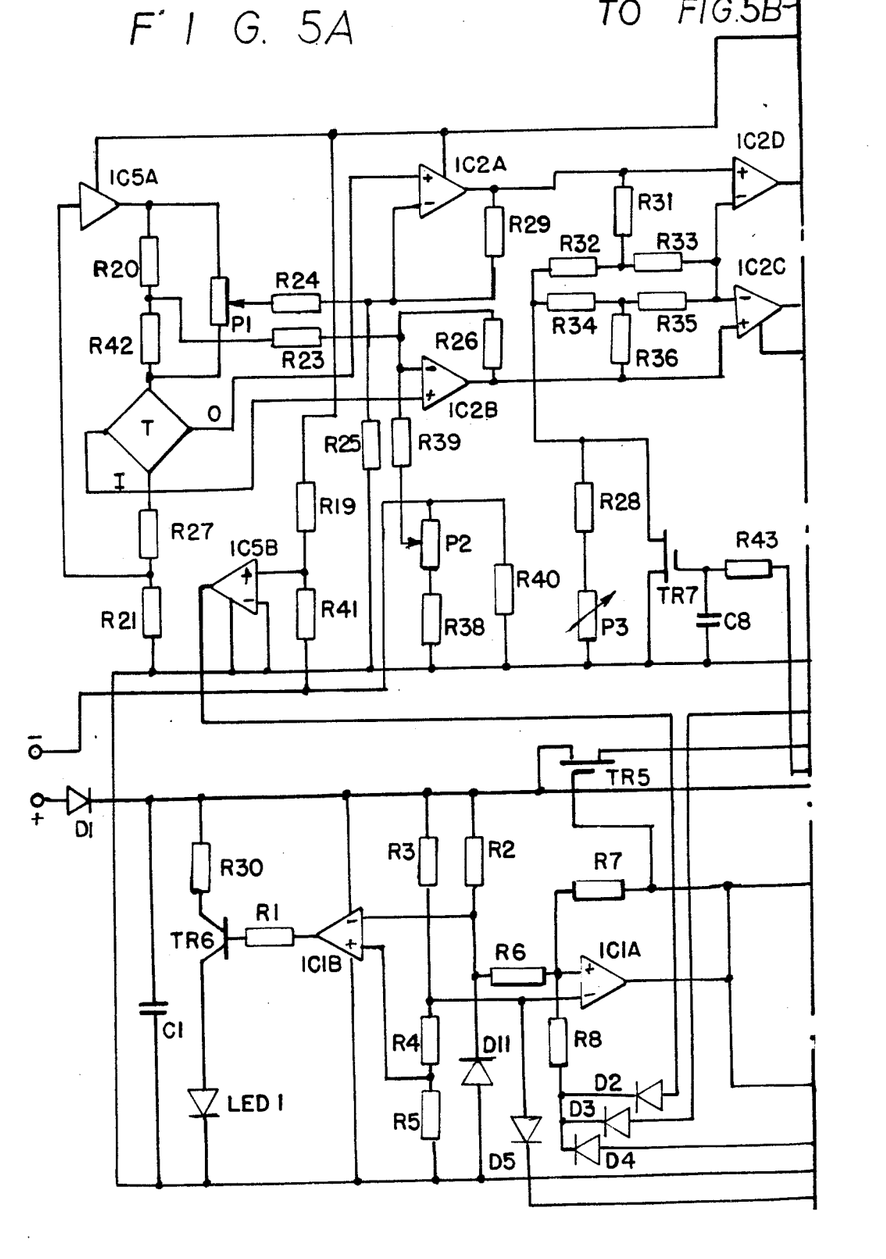
FIG. 5 is a circuit diagram of the invention.
Figure 5B:
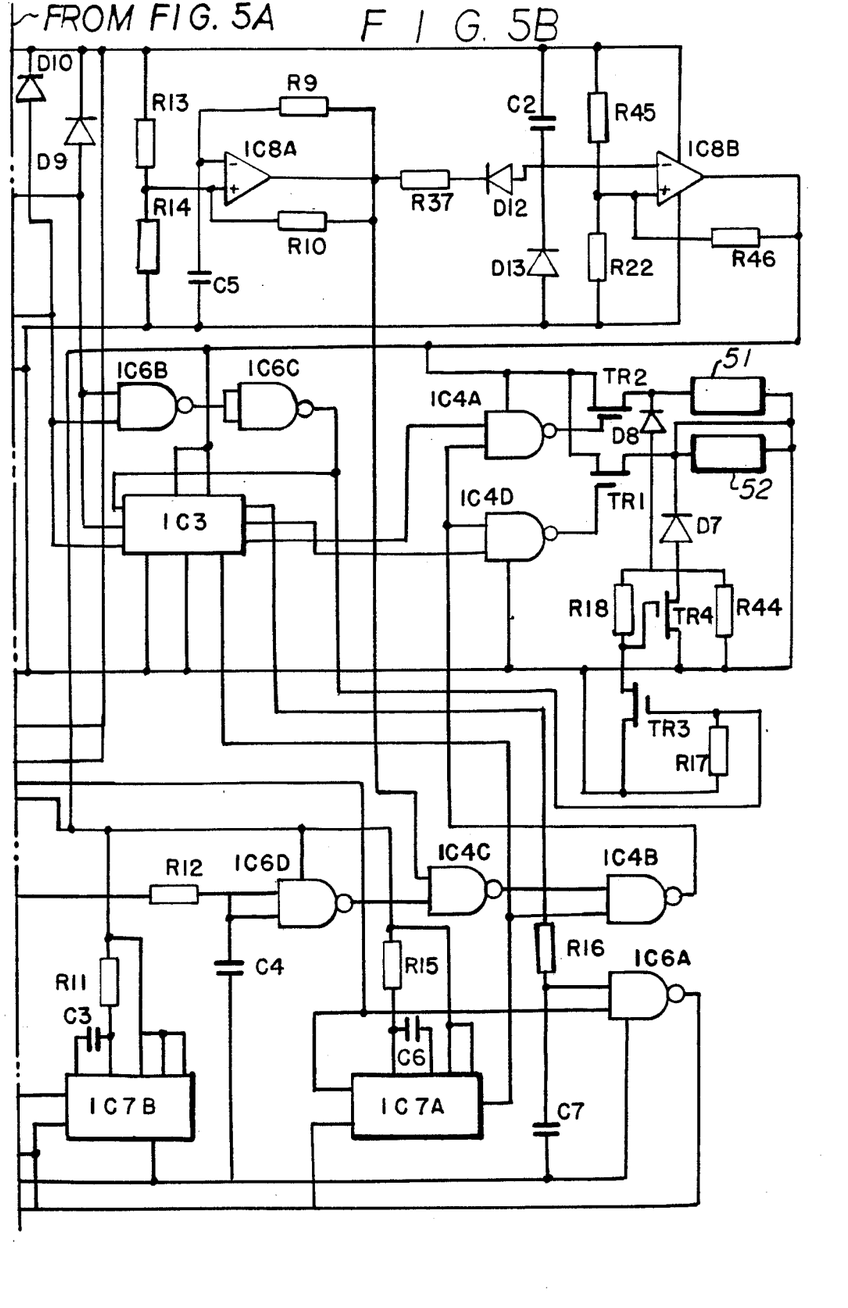

FIG. 4 shows a block diagram of the invention which incorporates the circuit shown in more detail in FIG. 5. In FIG. 4, input pressure 38 is controlled by valve 39 to give an output pressure 40. A transducer 41 provides an electrical signal on line 42 which signal is amplified by amplifier 43 and fed to the comparator circuit and logic circuit 44. The output of the transducer 41 is a measure of the pressure in the line 40.

An input signal in the range 4–20 mA is supplied on lines 45 to a power rail control and energy storage circuit 46. The main circuitry is fed via lines 47. The block 46 is connected to the comparator circuit and logic circuit 44. The minimum pressure setting can be adjusted by setter 48 with the input at 4 mA, and similarly the maximum pressure can be set by adjusting setter 49 with the input at 20 mA. The output of 44 is used to control the relay driver circuitry 50, which in turn controls the inlet and outlet Reedex (RTM) valves 51, 52. These valves control the pressure in the control volume 53, so as to control the output pressure 40.

Referring now to FIG. 5, this diagram can be split into two sections, the analogue circuitry and the digital circuitry, the analogue circuitry is on the left hand side of the circuit diagram and the digital on the right. The digital circuitry is continuously powered but the analogue is not, since very little current is used in CMOS digital circuitry.

C1 is the storage capacitor from which energy is taken to power the circuitry when the loop signal is valid whilst at a lower level than that required to power the electronics.

The supply rail potential is set by zener diode D11 in conjunction with the potential divider network R3, R4, R5. The rail potential is controlled via IC1b TR6, R1, R30 and LED1 and is set so that via R3, R4, R5 the same potential on D11 appears across R5.

IC1a is configured in standard Schmitt trigger configuration to detect that sufficient rail volts are present to power the analogue circuitry; if this is not the case then the output of IC1a goes high, in which state the analogue circuitry is powered down allowing the capacitor C1 to recharge.

There are four methods of shutting down the analogue circuitry; in all cases this action is through diodes D3, D4, D5, D6.

(1) If the loop signal fails this is detected by IC5b which compares a potential generated by the loop signal (P2, R38 & R40) to that of the analogue power rail via R19 and R41. When the loop signal fails the output of IC5b goes high forcing the Schmitt output to go high which turns off the analogue circuitry.

(2) IC7b sets a minimum off time for the analogue circuitry. When the analogue circuitry is switched off IC7b is triggered causing its output to go high for a set period of time typically 4.7 mS, which forces the output of the Schmitt trigger to stay high during this period ensuring that the analogue circuitry remains unpowered.

(3) The 'watchdog' method, in which, if the analogue circuitry is powered up and nothing happens for a preset time interval typically 5 seconds the circuitry around IC8b forces the output of IC8b to go high, turning off the analogue power which ensures that the circuitry does not become 'locked'.

(4) IC6a can turn the power off if its output goes low, which can only occur when both inputs are simultaneously high. If either valve is active then IC6c output will go low which, via IC3, will cause C7 to discharge through R16, thus taking one input low forcing the output of IC6a to be high. However, if neither valve is activated then C7 will charge up. Typically 5 mS after applying power to the analogue via TR5 circuitry IC6d output will go high taking IC6a input pin 1 with it thus forcing IC6a output low ie if no valve is active then the circuitry switches itself off.

Once power is applied to the analogue circuit, IC5a supplies the excitation current to the transducer T, the output of the transducer is amplified and compared with the desired set point, which is set by the combination of the loop signal acting on P2, R38 and R40.

If the set point is outside the deadzone then one of the comparators IC2c and IC2d will go low activating the appropriate valve via the valve driver circuitry.

The circuit includes an adaptive deadzone controller, in which, when power is applied to the analogue circuitry the deadzone is narrow therefore allowing one of the valves to go active. 5 mS + 10 $\mu$S after power is applied, 5 mS set by R12, C4, 10 $\mu$S set by R43, C8; TR7 is turned on widening the deadzone tending to turn valves off. The extra 10 $\mu$S is required to ensure that the deadzone is not changing when the valve activation status is being latched into IC3. The deadzone itself is controlled via R31, R32, R33, R36, R28, P3 and TR7. If TR7 is off then R28 and P3 are in circuit drawing very little current through resistors R31, R32, R34 & R36. This means the potential difference between the junction of R31, R32 & R33 to the junction of R34, R35 & R36 is also very small. Therefore the potential difference between the non-inverting and inverting inputs of IC2c & d is also small due to the potential divider action of R33, R35, requiring only a small change in either to trip the comparator and activate a valve.

However, if TR7 is on, shorting R28 and P3, significantly more current is drawn through R31 & R36 therefore increasing the potential difference between the two which in turn increases the change required to trip the comparators IC2c & d.

Normally the output of IC6d is held low, when power is reapplied to the analogue circuitry this output goes high typically 5 mS later; this delay is to ensure that the valve activation signals have settled before the valves are enabled. The delay is set by R12 and C4.

To turn either of the valves on, then the output of the respective NAND gates IC4 a & d must go low, which can only occur if both inputs to either of the gates are simultaneously high.

One input is taken from IC3 which is the inverse of the signal from IC2 c or d and the other is taken from IC4b.

Normally IC6d output is held low which forces ouput IC4c to be high, IC7a is normally high and both outputs then force IC4b to be low which ensures that neither valve turns on.

However when IC6d output goes high (as described above) this triggers IC7a which forces the output (pin 7) to go low which in turn forces IC4b to high (regardless of the logic condition of the other input on IC4b) which allows either valve to be turned on.

The time period set by IC7a serves two purposes: it locks out the activation signal to the valves via IC3 which ensures that the valves are not falsely triggered when the pressure changes or when the supply rail glitches when one valve opens. Also it sets the minimum opening time of either valve which in turn controls the resolution achievable. When IC7a times out, the valves are kept open by the 25 KHz pulses from IC8a via IC4c. The mark space ratio of these pulses is designed to minimise power consumption whilst keeping the valve open.

Built around the valves is a circuit which allows the energy stored in the valve coils to 'free wheel', ie when the 25 KHz pulse goes low a back emf is generated in the coil in accordance with Lenz's law, which is in the opposite direction to normal current flow. As such the current can flow through the Schottky diodes and back into the coil, keeping the valves open when no power is applied.

Instead of using a stored energy system, it is possible to use a micromotor of the type which draws 0.5 mA or less in which case a large step down transformer is required, although the motor can then act directly on the diaphragm of the valve. The electronic circuitry required would then both determine the level of the control signal and use a proportion of the power provided by the control signal to cause the micromotor to move the valve to the desired output pressure. Such micromotors are characterised by extremely low torque and high operating speeds and it would be necessary therefore to use a step down gear box, typically a 50,000:1 gear box to provide sufficient torque to operate the valve. Again, such micromotors could be combined with energy storage to provide a fail to pre-set rather than a simple fail to freeze system.

Rather than using reedex valves, switching piezoelectric or other low current drain valves could be used.

What is claimed is:

1. A fail to a user-predetermined-pressure value, two wire, electrically controlled fluid pressure regulator capable of operation with full-range control on an electrical current input in the range of about 4-20mA to produce a proportionate output pressure, said regulator comprising:
   (a) an inlet for a fluid whose pressure is to be regulated;
   (b) an outlet for said fluid at said output pressure;
   (c) a passageway interconnecting said inlet and outlet;
   (d) a valve seat in said passageway;
   (e) a moveable valve element cooperable with said valve seat and operable by the pressure of a control fluid contained in a chamber, the pressure of said control fluid being variable in response to said electrical input current whereby the output pressure will be proportional to said electrical input current;
   (f) a normally closed, electrically operated inlet valve and a normally closed, electrically operated output valve connected to said chamber, whereby the control fluid pressure in said chamber may be increased by opening said inlet valve to admit fluid at a higher pressure or decreased by opening said outlet valve to permit fluid in said chamber to exhaust;
   (g) a pressure transducer for producing a signal indicative of said output pressure; and
   (h) electrical circuitry for controlling said valves to adjust the pressure of the control fluid in said chamber, in response to a comparison between said input current and the signal produced by said pressure transducer, an average current demand of said electrical circuitry being less than about 4mA and said circuitry including storage means for storing a residual inputted electrical energy, and for supplying the stored electrical energy to said electrical circuitry in the event of failure of said electrical input current to provide current to operate said inlet and outlet valves, whereby said output pressure will assume said user-predetermined value.

2. A pressure regulator as claimed in claim 1 wherein the regulator fails to a pressure from the group of pressures consisting of the then current operating pressure and to some other predetermined pressure.

3. A pressure regulator as claimed in claim 1 wherein said storage means comprises a means from the group consisting of a capacitor and a battery.

4. A pressure regulator as claimed in claim 1 in which the electric circuitry is CMOS circuitry with an input clock.

5. A pressure regulator as claimed in claim 4 in which the electrical circuitry is substantially switched off by the clock to permit the storage means to be charged during periods of non-operation of the inlet and outlet valves.

6. A pressure regulator as claimed in claim 1 in which the inlet and outlet valves are electromagnetic coil-operated reed-switch flow control valves, the valves being pulsed to control the flow of fluid into and out of said chamber.

7. A pressure regulator as claimed in claim 6 in which the pulses are provided in two forms, a large pulse at maximum energy to cause one or other of the valves to open followed by a train of narrow lower energy pulses to hold the valve open.

8. A pressure regulator as claimed in claim 7 in which the overall length of the opening pulse and the train of smaller pulses is varied to hold the valves open for longer or shorter times.

9. A pressure regulator as claimed in claim 6 in which each reed valve is provided with a diode that permits energy storage of an inductance of the valve when its coil operating current is switched off.

10. A pressure regulator as claimed in claim 9 in which the diode is arranged in parallel with said coil.

11. A pressure regulator as claimed in claim 9 in which there is provided a resistance in series with the diode and the reed valve is provided with a bypass switch in parallel with the resistance.

12. A pressure regulator as claimed in claim 10 in which there is provided a resistance in series with the diode and the reed valve is provided with a bypass switch in parallel with the resistance.

13. A fail to a user-predetermined-pressure value, two wire, electrically controlled fluid pressure regulator capable of operation with full-range control on an electrical current input to produce a proportionate output pressure, said regulator comprising:
   (a) an inlet for a fluid whose pressure is to be regulated;
   (b) an outlet for said fluid at said output pressure;

(c) a passageway interconnecting said inlet and outlet;
(d) a valve seat in said passageway;
(e) a moveable valve element cooperable with said valve seat and operable by the pressure of a control fluid contained in a chamber, the pressure of said control fluid being variable in response to said electrical input current whereby the output pressure will be proportional to said electrical input current;
(f) a normally closed, electrically operated inlet valve and a normally closed, electrically operated output valve connected to said chamber, whereby the control fluid pressure in said chamber may be increased by opening said inlet valve to admit fluid at a higher pressure or decreased by opening said outlet valve to permit fluid in said chamber to exhaust;
(g) a pressure transducer for producing a signal indicative of said output pressure; and
(h) electrical circuitry for controlling said valves to adjust the pressure of the control fluid in said chamber, in response to a comparison between said input current and the signal produced by said pressure transducer, including storage means for storing a residual inputted electrical energy, and for supplying the stored electrical energy to said electrical circuitry in the event of failure of said electrical input current to provide current to operate said inlet and outlet valves, whereby said output pressure will assume said userpredetermined value.

* * * * *